United States Patent Office 2,771,828
Patented Nov. 27, 1956

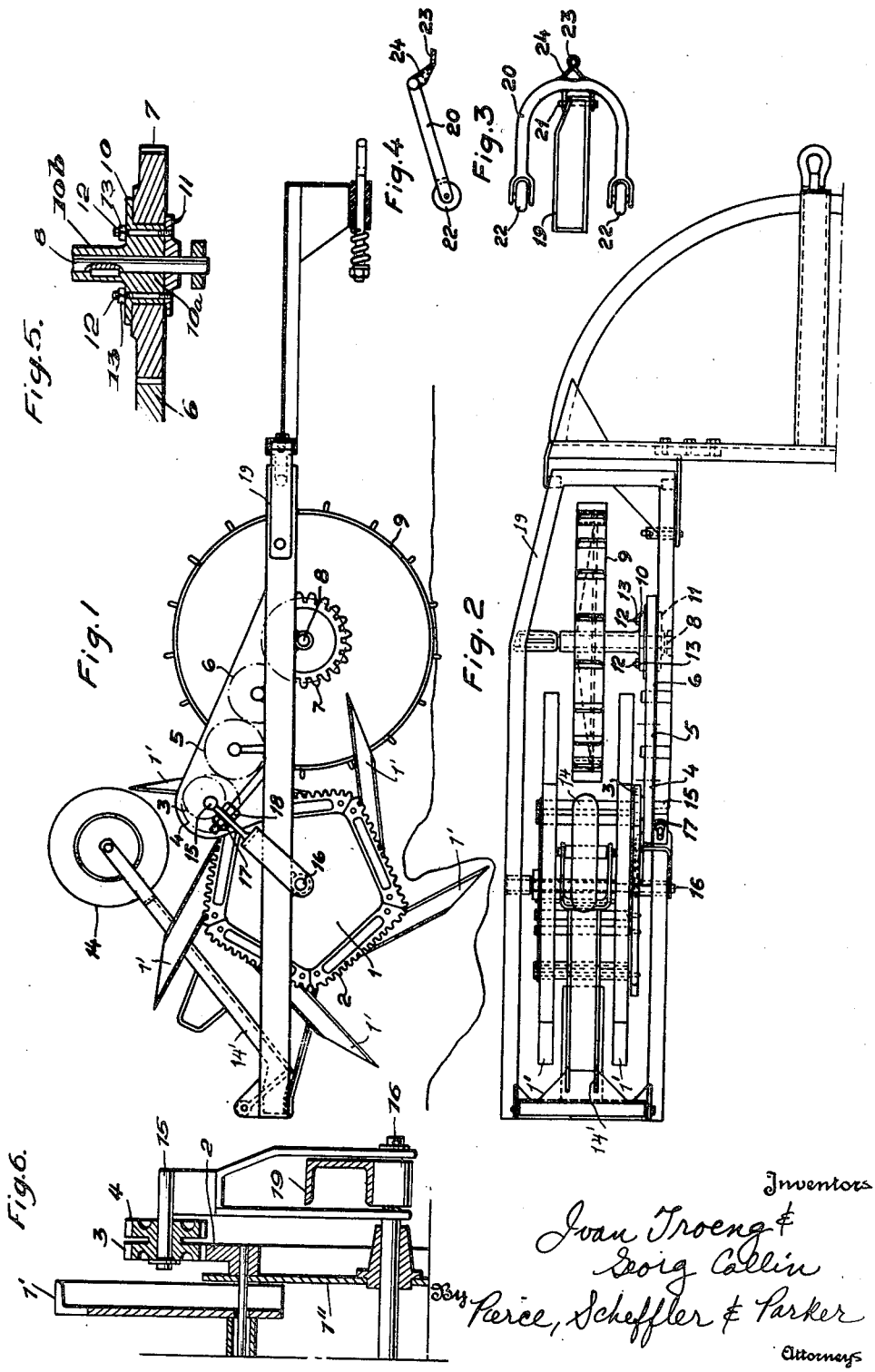

2,771,828

FOREST CULTIVATOR

Ivan Troeng and Georg Callin, Stockholm, Sweden

Application March 6, 1953, Serial No. 340,704

Claims priority, application Sweden March 7, 1952

4 Claims. (Cl. 97—40)

In cultivators for mechanical breaking-up of earth for forest cultivation a number of constructions have been proposed in which a raking device works at a slow rotation in the direction of travel, so that the rake scratches and puts aside scrub and peat continuously. These prior machines have been of a great weight as the constructions have been such that the rake claws work under an unfavorable angle during a part of their travel through the ground. Further these machines are hampered by roots and stones. The present invention has for its object to improve such machines to increase the raking ability at a lower total weight and a lower pulling resistance, and to eliminate all the risks of getting stuck and damages in connection with getting stuck. Another object of the invention is to increase the capacity by a double machine which is easy to handle.

These and other objects and the advantages of the invention will be apparent from the following specification when taken with the accompanying drawing, in which:

Fig. 1 is a side elevation of a cultivator embodying the invention;

Fig. 2 is a plan view of one half of a double unit cultivator;

Figs. 3 and 4 are schematic views, on a smaller scale, showing a traction arrangement for a single unit cultivator; and Fig. 5 is a horizontal central section through the main drive shaft and clutch mounting of the first driving gear.

Fig. 6 is an enlarged view showing the details of the gear drive.

The raking wheel 1 provided with five raking claws 1' is connected with a pentagonal gear rim 2 of a comparatively great diameter. By a great diameter the gear pressure decreases during the work and thus also the strain on the bearing and the frames whereby the weight of the machine can be kept low. The gear rim is driven by an eccentrically-mounted toothed wheel 3 which has the same number of teeth as each section of the pentagonal gear 2. The eccentricity serves the double purpose partly to vary the speed of the scratcher so that it becomes low at the best scratching angle and higher when passing from one claw to the next one, and partly to vary the torque load which the scratching wheel 1 imposes upon the shaft of the front wheel, so that the risk of skidding during the scratching work is reduced. By this the front wheels need not be so loaded, as would be necessary if there was not a varying torque. The construction gives a high structural strength and a good scratching ability at a low machine weight and a low pulling resistance. The force for rotating the eccentric toothed wheel is transmitted thereto by means of the gear train comprising gears 4, 5, 6 and 7, the latter being loose on shaft 8 of the front wheel 9 and mounted on the hub 10a of plate 10 of a torque-limiting clutch comprising plate 10 having a sleeve 10b keyed to shaft 8 and plate 11 secured to plate 10 by threaded bolts 12 extending through hub 10a and tightened by nuts 13 to seat the clutch plates against gear 7 with a desired pressure. Brake linings, not shown, may be applied to the contacting faces of gear 7 and the clutch plates, and in this manner a friction clutch is obtained in which it is easy to adjust the maximum force which can be transmitted. When this force is exceeded the scratching wheel will not rotate as the cultivator moves forwardly but will eventually be pulled free from the root or stone which causes the increased force. Thereby the machine is protected from sticking and the damage this causes on implement or tractor. Further the practicability in difficult country increases. From the friction clutch the load of the scratching work is imposed upon the front wheel or wheels. As the scratching claws during the scratching move forward at a lower speed than the cultivator, less effort for the forward motion is required than if they moved at the same speed as the cultivator. By the slower speed of the scratching claws the pulling resistance can be reduced to about half of the working resistance proper. Owing to this and also the friction clutch and the low weight of the machine it is possible even with a small light tractor to draw an implement with two scratchers. The front wheel may be provided with a ratchet device so that it is possible to move backwards without the claws being forced to scratch and use the front wheels at transport without the scratcher necessarily rotating. As the implement is entirely automatic and easy to draw, it is well adapted for higher speed than implements earlier known. The work often becomes better at high speed and it has appeared that the costs could be reduced to a fraction in comparison with machines hitherto used. Transportation of the implements is carried out by means of rubber wheels 14 on hinged frames 14' which can be turned counter-clockwise from the position shown in Fig. 1 to lift the scratchers above the ground or road surface.

The scratching wheel preferably consists of two round or pentagonal plates 1'' between which sets of claws 1' preferably welded of I-iron with two or three scratching points are tightened by means of through bolts or possibly welded thereto. On one side plate of the scratching wheel (sometimes on both sides) the gear rim is applied by means of bolting.

If the shaft pivot 15 which carries the eccentrically-mounted toothed wheel 3 and the toothed wheel 4 is fastened on an arm rotatable about the scratching wheel shaft 16 and adjustable by means of the nuts 17, 18, the distance between the shaft 15 and the toothed wheel 5 can be set arbitrarily. This renders the exchange of the toothed wheel 4 possible to vary the size and the spacing of the ground spots cleared by the individual scratchers 1'. By giving this toothed wheel a greater diameter longer spots and greater distance between the spots are obtained and by a smaller diameter a closer distance between the spots and smaller spots are obtained. This adjustability is of the greatest value for the varying condition within the agriculture.

In Fig. 2 is shown, as mentioned above, only the apparatus as above described, in its mounting frame 19, as the left half of a double-unit implement of symmetrical construction. This may be divided into two single parts which may be used individually as shown in Figs. 3 and 4. The single implement frame 19 then is mounted in a supporting frame 20 by the aid of a swinging shaft 21. The supporting frame 20 which is shown in Fig. 4 is provided with two wheels 22 rolling on the ground and a pulling loop 23 attached to the frame 20 through a connecting member 24 consisting of plates welded together.

While the apparatus has been described as a forest cultivator, it is to be understood that the apparatus is not limited to use in the breaking of new ground in a wooded area but may be employed in any region where roots or stones in the subsoil render it difficult or impractical to employ conventional plows.

Having now described our invention, what we claim as new and desire to secure by Letters Patent is:

1. A cultivator comprising the combination with a supporting frame, a front traction wheel and a rear scratching member rotatably supported in said frame, said scratching member having a plurality of scratching claws movable through the ground and back through air to the ground on rotation of said scratching member, of motion-transmitting means coupling said traction wheel to said scratching member to rotate the latter in the same direction as said traction wheel and at a speed lower than that of the traction wheel and cyclically varying, with its minimum value of speed occurring when a claw is in its scratching position.

2. A cultivator as recited in claim 1, wherein said motion-transmitting means comprises a regular polygonal toothed rim on said scratching member and having the same number of sides as there are scratching claws, a circular eccentrically-mounted gear wheel meshing with said toothed rim to drive the same, and a gear train coupling said eccentrically-mounted gear wheel to said traction wheel.

3. A cultivator as recited in claim 1, wherein said motion-transmitting means includes an adjustable torque-limiting clutch whereby when the maximum force which can be transmitted is exceeded, the load of the scratching work is imposed upon the front wheels.

4. A cultivator as recited in claim 2, wherein said circular gear wheel is eccentrically mounted on a shaft, said shaft being secured to an arm rotatable about the shaft of said scratching member, whereby the distance between said gear wheel shaft and the first gear of said gear train may be arbitrarily set to selectively receive gear wheels of different diameters to thereby vary the distance between the points of insertion of the scratching claws into the soil to be cultivated.

References Cited in the file of this patent

UNITED STATES PATENTS

| | | |
|---|---|---|
| 350,832 | Lubin | Oct. 12, 1886 |
| 385,382 | Stark | July 3, 1888 |
| 755,953 | Smith | Mar. 29, 1904 |
| 803,197 | Sonerholm | Oct. 31, 1905 |
| 809,716 | Miller | Jan. 9, 1906 |
| 1,301,226 | Cady | Apr. 22, 1919 |
| 1,530,920 | Waite | Mar. 24, 1925 |
| 1,637,290 | Ayers | July 26, 1927 |
| 2,585,117 | Gurries | Feb. 12, 1952 |
| 2,614,375 | Calkins | Oct. 21, 1952 |